US008725975B2

(12) United States Patent
Moyer (10) Patent No.: US 8,725,975 B2
(45) Date of Patent: May 13, 2014

(54) PROGRESSIVE MEMORY INITIALIZATION WITH WAITPOINTS

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1888 days.

(21) Appl. No.: 11/619,294

(22) Filed: Jan. 3, 2007

(65) Prior Publication Data

US 2008/0159059 A1 Jul. 3, 2008

(51) Int. Cl.
*G06F 3/06* (2006.01)

(52) U.S. Cl.
CPC .............. *G06F 3/061* (2013.01); *G06F 3/0632* (2013.01); *G06F 3/0673* (2013.01)
USPC ........................................................ 711/166

(58) Field of Classification Search
USPC .................... 711/156, 166, 218, 219; 714/706
See application file for complete search history.

(56) References Cited

U.S. PATENT DOCUMENTS

| | | | | |
|---|---|---|---|---|
| 6,122,718 | A * | 9/2000 | Ito | 711/219 |
| 6,178,490 | B1 * | 1/2001 | Gaultier et al. | 711/219 |
| 6,523,105 | B1 * | 2/2003 | Haneda | 711/209 |
| 6,601,153 | B1 * | 7/2003 | Engelbrecht et al. | 711/166 |
| 7,032,158 | B2 | 4/2006 | Alvarez, II et al. | |
| 7,200,743 | B1 | 4/2007 | Malpass | |
| 7,617,437 | B2 | 11/2009 | Moyer | |
| 2002/0054537 | A1 * | 5/2002 | Pascucci | 365/236 |
| 2003/0126416 | A1 | 7/2003 | Marr et al. | |
| 2004/0243886 | A1 * | 12/2004 | Klein | 714/42 |
| 2005/0071580 | A1 * | 3/2005 | LeClerg et al. | 711/154 |
| 2005/0114416 | A1 | 5/2005 | Liu et al. | |
| 2006/0136682 | A1 * | 6/2006 | Haridas et al. | 711/154 |
| 2007/0174411 | A1 | 7/2007 | Brokenshire et al. | |

OTHER PUBLICATIONS

Stallman, Richard, et al. Debugging with GDB: The GNU Source-Level Debugger. Jan. 2002. http://www.tutok.sk/fastgl/download/books/DebuggingWithGDB.pdf. 9th ed.*
U.S. Appl. No. 11/359,329, filed Feb. 21, 2006, Inventor: Moyer, William.
Final Office Action mailed Mar. 4, 2010 for U.S. Appl. No. 11/619,298, 13 pgs.
Final Office Action mailed Nov. 25, 2011 for U.S. Appl. No. 11/619,298, 15 pgs.
Non-Final Office Action mailed Apr. 1, 2011 for U.S. Appl. No. 11/619,298, 14 pgs.

(Continued)

*Primary Examiner* — Nathan Sadler (57) ABSTRACT

A method includes initializing a counter value of a hardware counter. The method further includes iteratively adjusting the counter value and storing an initialization value to a memory location using a memory address based on the counter value. The method also includes generating an interrupt request based on a comparison of the counter value to a waitpoint value concurrent with iteratively adjusting and storing. A memory device includes a memory array and an initialization module. The initialization module includes a counter, a register to store a waitpoint value, write logic configured to write an initialization value to a memory location of the memory array associated with a memory address that is based on a counter value of the counter, and interrupt logic configured to generate an interrupt request based on a comparison of the counter value of the counter to the waitpoint value.

20 Claims, 4 Drawing Sheets

(56) References Cited

OTHER PUBLICATIONS

Non-Final Office Action mailed Jun. 22, 2012 for U.S. Appl. No. 11/619,298, 12 pgs.
Non-Final Office Action mailed Sep. 13, 2010 for U.S. Appl. No. 11/619,298, 13 pgs.
Non-Final Office Action mailed Sep. 16, 2009 for U.S. Appl. No. 11/619,298, 14 pgs.
Final Office Action mailed Dec. 18, 2012 for U.S. Appl. No. 11/619,298, 13 pgs.

* cited by examiner

PROGRESSIVE MEMORY INITIALIZATION WITH WAITPOINTS

CROSS-REFERENCE TO RELATED APPLICATION(S)

This application is related to U.S. patent application Ser. No. 11/619,298 entitled "Hardware-based Memory Initialization with Software Support" by William C. Moyer filed on Jan. 3, 2007, which is assigned to the current assignee hereof and incorporated herein by reference in its entirety.

FIELD OF THE DISCLOSURE

The present disclosure relates generally to circuit devices and more particularly to memory devices.

BACKGROUND

Memory devices often employ an error detection/correction technique to reduce the impact of storage errors. For example, a memory device can store error correcting code (ECC) information for memory locations in the memory device. The ECC data contains parity data or other data that allows the memory device to detect errors and, in some instances, correct detected errors. While memory error detection/correction techniques can improve memory reliability, the techniques also consume device resources so as to increase power consumption and increase the response time of the device. The consumption of these resources may be undesirable in some applications, such as in portable devices or other low-power devices.

In order to improve memory reliability in view of potential storage errors, some memory devices employ an initialization scheme wherein after a certain stimulus (such a reset stimulus, a power-on stimulus, or other event) all of the memory locations of the memory device are filled with an initialization value and the corresponding ECC data for the memory location is calculated based on the initialization value for the memory location. In some implementations, the initialization scheme is implemented by software at a corresponding processor whereby the processor stores initialization values into each memory location of the memory device using a memory access transaction via an external bus. This implementation results in excessive power consumption and is time consuming due to the bus transaction required for each memory location. In another implementation, the memory device initializes itself using hardware at the memory device, thereby avoiding the bus transactions required by the software-based approach. However, in conventional implementations, the initialization hardware at the memory device is not visible to the software being executed at the processor at the time of initialization, and thus the software is unable to track the progress of the initialization of the memory device. Accordingly, the software typically is required to wait until the entire memory device has been initialized, even though the software may need only a relatively small portion of the storage capacity of the memory device, resulting in excessive power consumption and unnecessary delay. Therefore, it is desirable to provide a memory initialization technique without unnecessarily consuming device resources.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

In accordance with one aspect of the present disclosure, a method includes initializing a counter value of a hardware counter in response to an initialization stimulus and iteratively adjusting the counter value of the hardware counter and storing an initialization value to a memory location of a memory array using a memory address that is based on the counter value. The method further includes accessing the counter value from the hardware counter for storage by a processor concurrent with iteratively adjusting the counter value and storing the initialization value.

In accordance with another aspect of the present disclosure, a system includes a memory device. The memory device includes a memory array including a plurality of memory locations and a software-accessible counter. The memory device further includes write logic configured to write an initialization value to a memory location of the memory array associated with a memory address based on a counter value of the software-accessible counter.

In accordance with another aspect of the present disclosure, a computer readable medium embodying a set of executable instructions is provided in a system including a processor, a memory array, a hardware counter, and write logic configured to write an initialization value to a memory location of the memory array associated with a memory address that is based on a counter value of the hardware counter, a computer-readable medium embodying a set of executable instructions. The set of executable instructions includes at least one executable instruction configured to manipulate the processor to access the counter value from the hardware counter for storage at the processor.

In accordance with another embodiment of the present disclosure, a method includes initializing a counter value of a hardware counter in response to an initialization stimulus. The method further includes iteratively adjusting the counter value and storing an initialization value to a memory location of a memory array using a memory address based on the counter value. The method also includes generating an interrupt request based on a comparison of the counter value to a waitpoint value concurrent with iteratively adjusting the counter value and storing the initialization value.

In accordance with yet another aspect of the present disclosure, a system includes a memory device. The memory device includes a memory array including a plurality of memory locations, and an initialization module. The initialization module includes a counter, a register to store a waitpoint value, and write logic configured to write an initialization value to a memory location of the memory array associated with a memory address that is based on a counter value of the counter. The initialization module further includes interrupt logic configured to generate an interrupt request based on a comparison of the counter value of the counter to the waitpoint value.

In accordance with an additional aspect of the present disclosure a computer-readable medium embodying a set of executable instructions is provided in a system including a processor, a memory array, a hardware counter, write logic configured to write an initialization value to a memory location of the memory array associated with a memory address based on a counter value of the hardware counter, a register, and interrupt logic configured to generate an interrupt request based on a comparison of the counter value of the counter to a waitpoint value stored in the register. The set of executable instructions includes at least one executable instruction configured to manipulate the processor to store a waitpoint value at the register, suspend an execution of the set of executable instructions to wait for an interrupt request from the interrupt logic, and resume the execution of the set of executable instructions in response to the interrupt request from the interrupt logic.

FIGS. 1-7 illustrate example techniques for progressively initializing a memory device in response to an initialization stimulus. In one embodiment, a hardware counter at the memory device is initialized. A counter value of the hardware counter is adjusted (i.e., incremented or decremented) and an initialization value is stored to a memory location of the memory device based on an address value represented by the adjusted counter value. The process of adjusting the counter value and storing an initialization value to a memory location associated with the adjusted counter value is repeated for some or all of the memory locations of the memory device. During the initialization process, a corresponding processor can be informed of the progress of the memory initialization process. In one embodiment, the hardware counter is software-accessible and the processor therefore can execute a load-type instruction that results in a copy of the current counter value from the hardware counter to a register of the processor, whereby the copy of the current counter value in the register can be used to determine the progress of the initialization process. To illustrate, software being executed by the processor can implement one or more waitpoints whereby the execution of the software can be suspended at some point until the initialization process progresses to or past a predetermined memory initialization threshold. Accordingly, the software, through the processor, can periodically poll the hardware counter to determine its current counter value. From the current counter value the software can determine the progress of the initialization process relative to the predetermined memory initialization threshold and thus can resume execution of the software program or remain suspended depending on the outcome of the determination. In another embodiment, the memory device implements one or more registers to store corresponding waitpoint values, which may be configured via, for example, a store instruction executed by the processor. When the counter value is adjusted, the memory device compares the current counter value with one or more of the waitpoint values, and if there is a match (or, alternately, if the counter value is within a predetermined threshold of a waitpoint value), the memory device generates an interrupt or may set one or more software accessible status indicators, which then can be processed by, for example, an interrupt handler of the processor so as to permit the execution of the software program to resume. Software accessible resources such as the counter or the status flags are able to be queried by normal processing instructions executing on the processor so that run-time decisions can be implemented by the software algorithms being executed by the processor.

Figure 1:
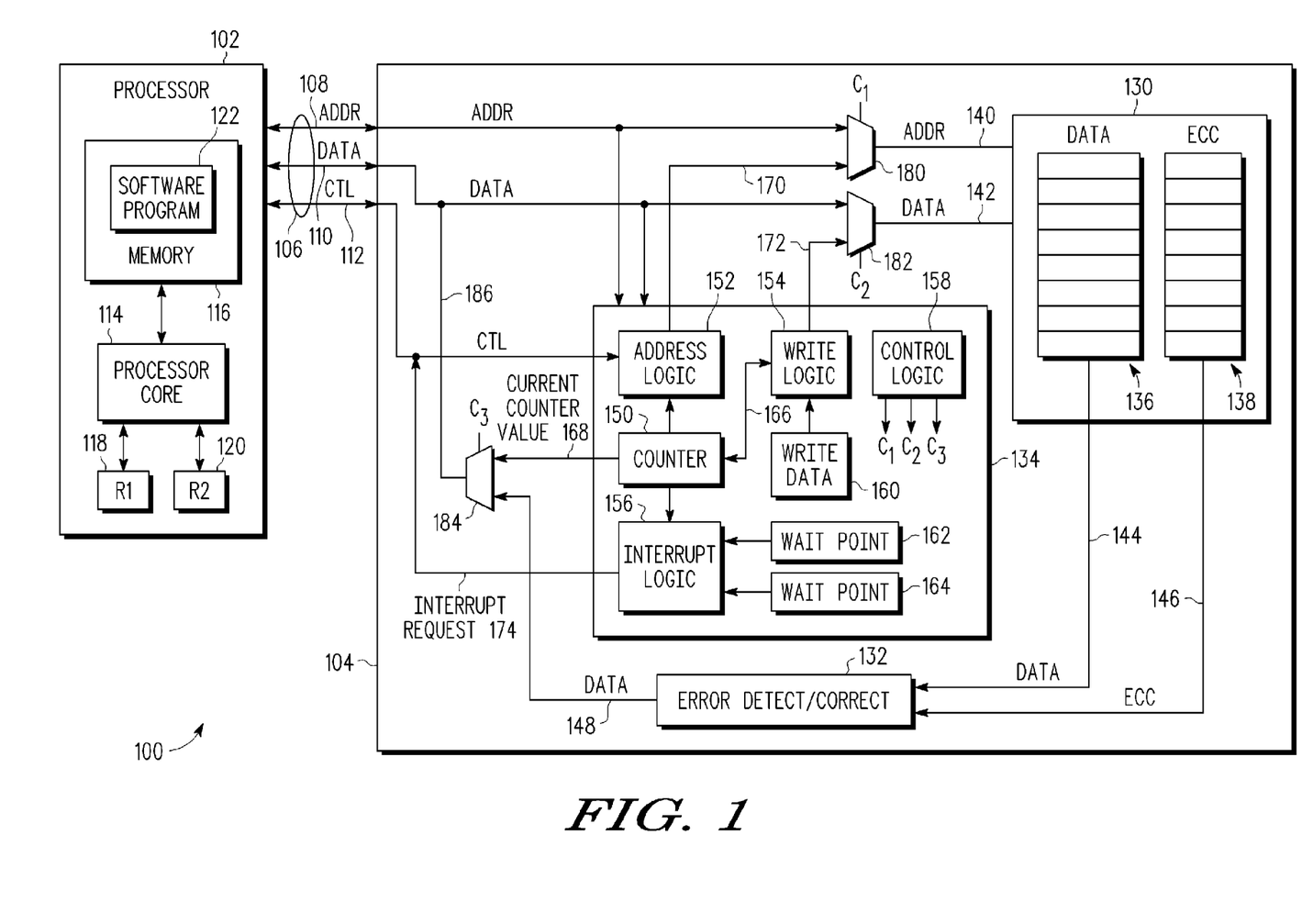
FIG. 1 is a diagram illustrating a data processing system utilizing a progressive memory initialization technique in accordance with at least one embodiment of the present disclosure.

FIG. 1 illustrates a data processing system 100 utilizing a progressive memory initialization in accordance with at least one embodiment of the present disclosure. In the depicted example, the data processing system 100 includes a processor 102, a memory device 104 (e.g., random access memory (RAM) device, a flash memory device, a hard disk device, etc.). The processor 102 and the memory device 104 are connected via a bus 106, whereby the bus 106 includes address signaling 108, data signaling 110, and control (CTL) signaling 112.

The processor 102 includes a processor core 114 (e.g., a central processing unit (CPU)), a local memory 116 (e.g., a level 1 or level 2 cache), and one or more general purpose registers (e.g., registers 118 and 120). In one embodiment, the processor core 114 is configured to execute instructions from one or more software programs 122, whereby the data representing the instructions of the software programs 122 can be obtained from, for example, the memory device 104 and cached in the local memory 116 before or during execution.

In the illustrated example, the memory device 104 includes a memory array 130, an error detect/correct module 132, and a memory initialization module 134. The memory array 130 includes a plurality of memory locations, each memory location including a storage location of a data array 136 that stores data and a corresponding storage location of an ECC array 138 that stores error correcting code (ECC) information associated with the data stored at the corresponding storage location of the data array 136. Alternatively, the data and ECC storage may be combined into one or multiple arrays or in other manners. The memory array 130 further includes an input to receive an address value 140, an input to receive a data value 142, an output to provide a data value 144 from the data array 136, and an output to provide an ECC value 146 from the ECC array 138. During a write operation, the memory array 130 is configured to store the data value 142 at the storage locations of the data array 136 and/or the ECC array 138 corresponding to the address value 140. Error correction codes may be calculated for storage into the ECC array 138 during a write operation by logic within memory array 130, or may be calculated by logic external to memory array 130 based on data value 142. During a read operation, the memory array 130 is configured to output the data value stored at the storage location of the data array 136 corresponding to the address value 140 as the data value 144 and configured to output the ECC value stored at the storage location of the ECC array 138 corresponding to the address value 140 as the ECC value 146.

The error detect/correct module 132 includes an input to receive the data value 144, an input to receive the ECC value 146, an output to provide a data value 148, and an output to provide an error condition indicator (not shown). The error detect/correct module 132 is configured to apply one or more error detection and/or error correction techniques to the data value 144 using the ECC value 146 to detect any errors in the data value 144, and, if an error is detected, to correct the error to generate the data value 148.

The memory initialization module 134 includes a hardware counter 150, address generation logic 152, write logic 154, interrupt logic 156, control logic 158, one or more write data registers, such as write data register 160, and one or more waitpoint registers, such as waitpoint registers 162 and 164. In one embodiment, the write data register 160 is used to store an initialization value to be written to some or all of the memory locations of the memory array 130. The waitpoint registers 162 and 164, in one embodiment, are used to store waitpoint values representative of memory initialization thresholds vis-à-vis the current counter value 168.

The hardware counter 150 includes a register or other storage location used to store a counter value the hardware counter 150 adjusts (increments or decrements) in response to a control signal 166. In one embodiment, the storage location of the hardware counter 150 is accessible via the bus 106 and thus the current counter value 168 is accessible to the processor 102 and software executed by the processor 102.

The address generation logic 152 includes an input to receive the current counter value 168 of the hardware counter 150 and an output to provide an address value 170 based on the current counter value 168. To illustrate, the current counter value 168 can represent a virtual address that the address generation logic 152 translates to a physical address using any of a variety of address mapping techniques. Alternately, the current counter value 168 can represent the physical address, in which case the address generation logic 152 can act as a signal driver and thereby pass the current counter value 168 through as the address value 170.

The write logic 154 includes an input to receive an initialization value 172 stored in the write data register 160 and an output to drive the initialization value 172. Further, the write logic 154 is configured to verify a successful write using the initialization value 172, and after verification, asserting the control signal 166 so as to direct the hardware counter 150 to adjust the current counter value 168. In an alternate embodiment, the control logic 158 provides the control signal 166.

The interrupt logic 156 includes inputs to receive the waitpoint values stored at the waitpoint registers 162 and 164, an input to receive the current counter value 168, and an output to provide an interrupt request 174 based on a comparison of one or more of the waitpoint values to the current counter value 168. The interrupt logic 156 is illustrated in greater detail below with reference to FIG. 2.

As depicted in the example of FIG. 1, the memory device 104 further can include multiplexers 180, 182, and 184 or other selection components so as to control which values are provided to the memory array 130 and which values are output by the memory device 104 to the processor 102. The multiplexer 180 is configured to provide as the address value 140 a select one of an address value provided by the processor 102 via the address signaling 108 of the bus 106 or the address value 170 provided by the address generation logic 152 based on a control signal $C_1$ provided by the control logic 158. The multiplexer 182 is configured to provide as the data value 142 a select one of a data value provided by the processor 102 via the data signaling 110 of the bus 106 or the initialization value 172 provided by the write logic 154 based on a control signal $C_2$ provided by the control logic 158. The multiplexer 184 is configured to provide as a data value 186 a select one of the current counter value 168 of the hardware counter 150 or the data value 148 output by the error detect/correct module 132 based on a control signal $C_3$ provided by the control logic 158.

The control logic 158 is configured to provide the control signals $C_1$, $C_2$, and $C_3$ depending on operations performed at the memory device 104. For load and store accesses to the memory array 130, the control logic 158 configures the control signals $C_1$ and $C_2$ such that the address values and the data values provided by the processor 102 are passed to the memory array 130 by the multiplexers 180 and 182. Further, for load accesses to the memory array 130, the control logic 158 configures the control signal $C_3$ such that the data value 148 output by the error/detect correct module 132 is provided to the bus 106 for transmission to the processor 102. For memory initialization operations, the control logic 158 configures the control signals $C_1$ and $C_2$ such that the address value 170 and the initialization value 172 are provided to the memory array 130 via the multiplexers 180 and 182, respectively. For load accesses to the hardware counter 150 to obtain the current counter value 168, the control logic 158 configures the control signal $C_3$ such that the current counter value 168 is provided to the bus 106 via the multiplexer 184.

In a memory configuration mode, the processor 102 can initiate a memory access to store one or more waitpoint values at the waitpoint registers 162 and 164. Further, the processor 102 can initiate a memory access to store the initialization value 172 to the write data register 160. In one embodiment, the waitpoint registers 162 and 164, as well as the write data register 160, each are assigned a memory address so as to be addressable via the bus 106. Accordingly, the processor 102 can execute one or more store instructions of, for example, the software program 122 so as to store the respective values into the waitpoint registers 162 and 164 and the write data register 160.

The memory device 104 enters an initialization mode in response to an initialization stimulus, which can include a software handshake or other signal from the processor 102 (e.g., a reset signal), a power-on event for the memory device 104, and the like. During the initialization mode, the hardware counter 150 is loaded with an initial counter value. The address generation logic 152 then generates the address value 170 from the initial counter value and the write logic 154 drives the initialization value 172 to the memory location of the memory array 130 associated with the address value 170. The write logic 154, or alternately the control logic 158, then signals the hardware counter 150 to adjust its counter value and the initialization value is stored in the memory location of the memory array 130 associated with the adjusted counter value. This process is repeated until the memory array 130 is completely initialized or the memory initialization module 134 is signaled to cease initialization. During initialization, memory accesses are permitted by the processor 102, and are normally given priority over an initialization write into memory arrays 130. In the case of simultaneous memory requests, initialization updates are delayed, and resume after satisfying a processor access request. In an alternate embodiment, other well known methods for arbitration and access prioritization may be used to resolve conflicting requests.

In one embodiment, the processor 102 can poll the memory device 104 by accessing the current counter value 168 of the hardware counter 150 during the initialization process by, for example, executing a load instruction having a source address associated with the hardware counter 150 and a destination address associated with one of the general purpose registers 118 or 120, whereby the current counter value 168 can be stored at, for example, one of the general purpose registers 118 or 120. Software executed by the processor 102 then can determine the progress of the memory initialization based on the locally-stored current counter value 168 and take action accordingly. To illustrate, the software program 122 may implement one or more execution suspend routines that suspend processing of the remainder of the software program 122 until a certain degree of progress has been made in initializing the memory device 104. The execution suspend routines can repeatedly poll the hardware counter 150 until it is determined that the initialization has sufficiently progressed. For example, rather than having to wait for the entire memory device to be initialized as in conventional schemes, the software program 122 instead may be configured in segments such that each successive segment can proceed to execution once a corresponding amount of storage capacity of the memory device 104 has been initialized and therefore available for use by the segment. Thus, each segment can include an execution suspend instruction such that the next segment does not begin substantial execution until the next portion of the memory array 130 has been initialized and made available for its use.

In addition to, or instead of, polling the hardware counter 150, in one embodiment, the interrupt logic 156 can be configured via the waitpoint registers 162 and 164 to generate an interrupt request 174 when the current counter value 168 becomes equal to one of the stored waitpoint values. Thus, rather than utilizing a number of bus cycles of the bus 106 to poll the hardware counter 150, the software program 122 or other software can configure the initialization module 134 to generate an interrupt request whenever the current counter value 168 reaches a predetermined waitpoint, which represents a corresponding degree of initialization progress. The interrupt request 174 then can be processed by an interrupt handling routine (not shown) of the processor 102 as appropriate.

By informing the software being executed by the processor 102 of the current state of the memory initialization process, either via software polling of the hardware counter 150 or via interrupt generation based on waitpoint values, the software/processor 102 does not need to wait for the memory device 104 to be fully initialized and instead can execute progressive program segments as the storage capacity needed for each program segment is initialized and made available. Further, in some instances, the software program being executed may not need all, or even a substantial portion, of the storage capacity of the memory device 104 as typically is the case with an interrupt handling routine or other software routine initialized in response to a wakeup event. Accordingly, the processor 102 can reduce the power consumed and the time and effort expended by facilitating execution of software before the memory device 104 is fully initialized.

Figure 2:
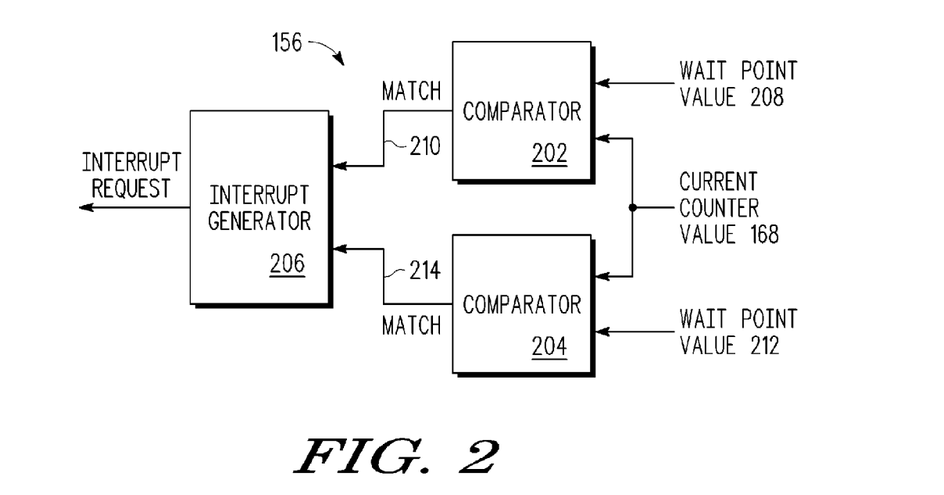
FIG. 2 is a diagram illustrating an interrupt generator of a memory device of the data processing system of FIG. 1 in accordance with at least one embodiment of the present disclosure.

FIG. 2 illustrates an example implementation of the interrupt logic 156 of the memory initialization module 134 in accordance with at least one embodiment of the present disclosure. In the depicted example, the interrupt logic 156 includes one or more comparators (e.g., comparators 202 and 204) and an interrupt generator 206. Although FIG. 2 illustrates an implementation with two comparators for two waitpoint values, it will be appreciated that more than two comparators can be implemented, or that only one comparator and one waitpoint may be used. Moreover, rather than using a separate comparator for each waitpoint value supported, the interrupt logic 156 can use the same comparator to check multiple waitpoint values.

The comparator 202 includes an input to receive a waitpoint value 208 stored at the waitpoint register 162 (FIG. 1), an input to receive the current counter value 168 from the hardware counter 150 (FIG. 1), and an output to provide a match signal 210. Likewise, the comparator 204 includes an input to receive a waitpoint value 212 stored at the waitpoint register 164 (FIG. 1), an input to receive the current counter value 168 from the hardware counter 150, and an output to provide a match signal 214. Each of the comparators 202 and 204 is configured so as to assert its respective match signal in response to determining a match between its respective input waitpoint value and the current counter value 168. The comparators 202 and 204 therefore can be configured as, for example, nested XOR gates.

The interrupt generator 206 includes an input to receive the match signal 210, an input to receive the match signal 214, and an output to provide the interrupt request 174. The interrupt generator 206 is configured to generate the interrupt request 174 in response to one of the match signals 210 and 214 being asserted. The interrupt request 174 can include information regarding the triggered waitpoint, such as the waitpoint value that caused the interrupt request, etc.

Figure 3:
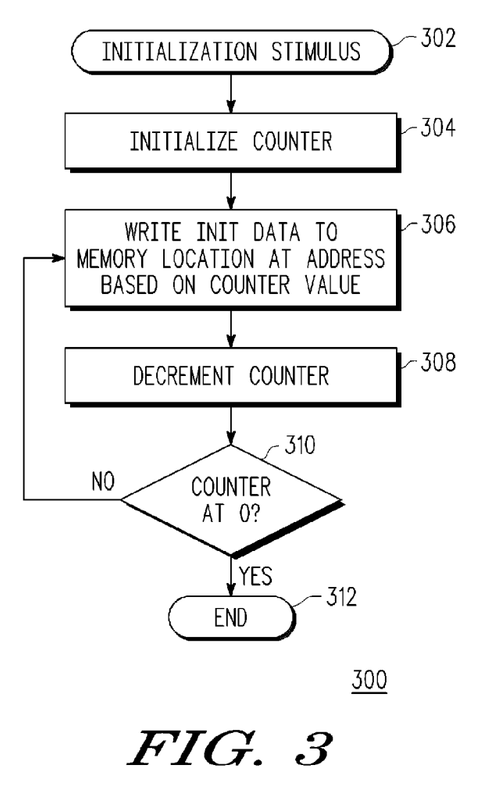
FIG. 3 is a flow diagram illustrating a method for progressively initializing a memory device in accordance with at least one embodiment of the present disclosure.

FIG. 3 illustrates a method 300 for initializing a memory device in accordance with at least one embodiment of the present disclosure. For ease of illustration, the method 300 is described herein in the context of the data processing system 100 of FIG. 1.

At block 302, an initialization stimulus is received at the memory device 104. The initialization stimulus can include, for example, a signal from the processor 102, a reset event, or a power-on event. At block 304, the control logic 158 initializes the current counter value 168 of the hardware counter 150 with an initial counter value. It is assumed for the purposes of discussion that the hardware counter 150 is initialized with a non-zero number and then decremented. Accordingly, in one embodiment, the initial counter value is representative of the highest accessible memory address of the memory array 130.

At block 306, the address generation logic 152 generates an address value from the current counter value 168 and the write logic 154 stores an initialization value to the memory location of the memory array 130 identified by the generated address value. In one embodiment, the initialization value includes both a data value and a corresponding ECC value calculated for the data value and thus a portion of the initialization value is stored to a storage location of the data array 136 and the remaining portion of the initialization value is stored to the corresponding storage location of the ECC array 138. After verifying the write operation at block 306 is successful, at block 308 the write logic 154 or the control logic 158 directs the hardware counter 150 to decrement the current counter value 168.

At block 310, the control logic 158 determines whether the current counter value 168 has reached a predetermined limit (e.g., zero in this example). If the limit has not been met, flow returns to block 306 and the initialization process of blocks 306-310 for the next memory location identified by the adjusted current counter value 168 is repeated. If the limit has been met, the method 300 ends at block 312.

Figure 4:
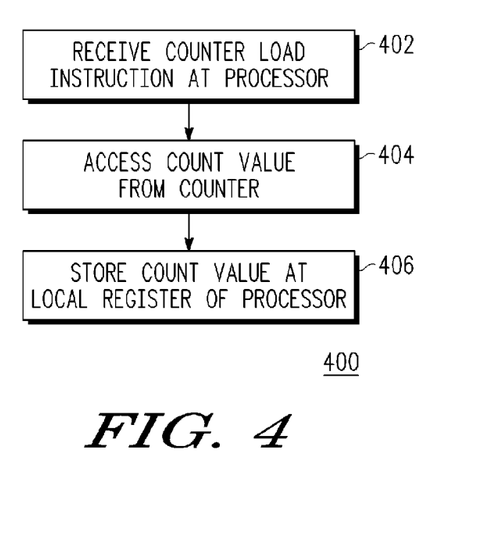
FIG. 4 is a flow diagram illustrating a method for a software-based access of a hardware counter of the memory device of the data processing system of FIG. 1 in accordance with at least one embodiment of the present disclosure.

FIG. 4 illustrates a method 400 for accessing the hardware counter 150 via software during memory initialization in accordance with at least one embodiment of the present disclosure. For ease of illustration, the method 400 is described herein in the context of the data processing system 100 of FIG. 1. In at least one embodiment, the process represented by method 400 is performed concurrently with the memory initialization process represented by method 300 of FIG. 3.

As described above, the hardware counter 150, in one embodiment, is software-accessible in that it is addressable via the bus 106. Accordingly, at block 402, the processor 102 receives a load instruction during execution of a software program, whereby the load instruction manipulates the processor 102 to initiate a load access to hardware counter 150 using the memory address associated with the hardware counter as the source address of the load instruction. At block 404, the memory device 104 responds to the load access by providing the current counter value 168 of the hardware counter 150 to the processor 102 via the bus 106. At block 406, the processor 102 stores the received current counter value 168 and stores it at a local register, whereby the processor 102 can use the local copy of the current counter value 168 to determine the progress of the memory initialization, to trigger a waitpoint in the software program being executed, and the like.

Figure 5:
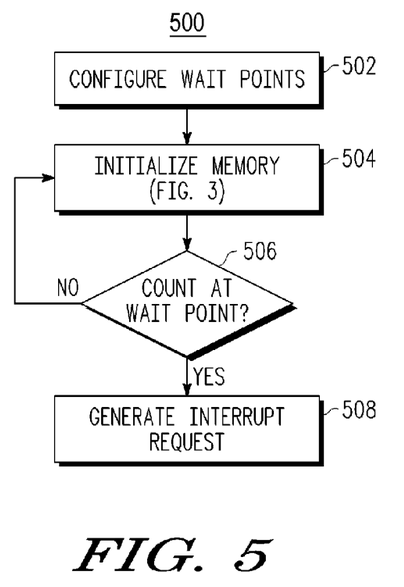
FIG. 5 is a flow diagram illustrating a method for progressively initializing a memory device based on software-configurable waitpoints in accordance with at least one embodiment of the present disclosure.

FIG. 5 illustrates a method 500 for generating interrupt requests based on the hardware counter 150 during memory initialization in accordance with at least one embodiment of the present disclosure. For ease of illustration, the method 500 is described herein in the context of the data processing system 100 of FIG. 1.

At block 502, the waitpoint registers 162 and 164 of the memory initialization module 134 are loaded with predetermined waitpoint values to be utilized by a software program in determining the progress of the initialization of the memory device 104, for enabling waitpoints in the software execution, and the like. At block 504, the initialization of the memory device 104 begins as described with respect to method 300 of FIG. 3.

In response to the adjustment of the current counter value 168 of the hardware counter 150 (e.g., as performed at block 308, FIG. 3), the interrupt logic 156 compares the current counter value 168 with one or more waitpoint values to determine whether there is a match at block 506. If no match is detected, flow returns to block 504, whereby the memory initialization progresses. If there is a match, the interrupt logic 156 generates an interrupt request 174 and provides the interrupt request to the processor 102 for processing at block 508. Flow then returns to block 504 for the next waitpoint. In one embodiment, the process represented by block 508 is performed concurrently with the method 300 of FIG. 3 such that the decision is evaluated at each step of the initialization process.

Figure 6:
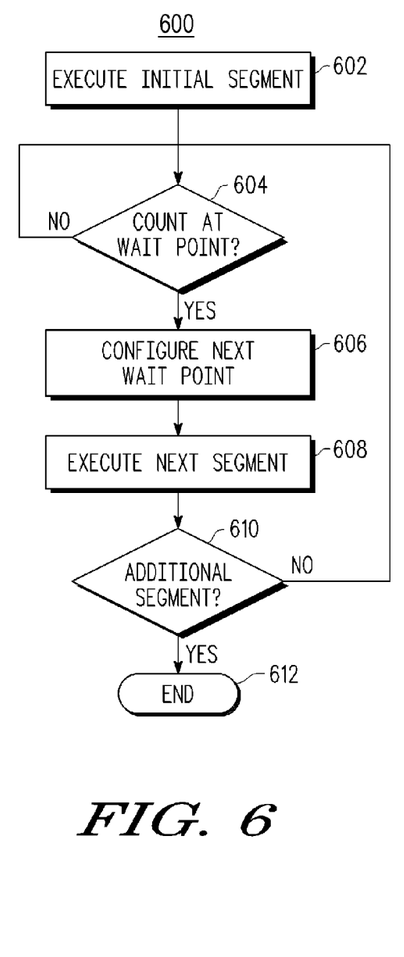
FIG. 6 is a flow diagram illustrating a method for sequentially executing successive segments of a software program based on memory initialization progress in accordance with at least one embodiment of the present disclosure.

FIG. 6 illustrates a method 600 for sequentially executing software program segments concurrent with memory initialization in accordance with at least one embodiment of the present disclosure. For ease of illustration, the method 600 is described herein in the context of the data processing system 100 of FIG. 1. In at least one embodiment, the process represented by method 600 can be performed concurrently with the memory initialization process represented by method 300 of FIG. 3.

As described above, a software program can be configured into segments whereby the execution of each segment is predicated upon the memory initialization process progressing to a certain point. As the current counter value 168 of the hardware counter 150 is representative of the number of memory locations initialized and thus the progress of the memory initialization process, the segments of the software program can correspond to various waitpoints of the current counter value 168, whereby when the current counter value 168 reaches an identified waitpoint, the next software segment is permitted to execute. Accordingly, at block 602 the memory initialization process (e.g., method 300, FIG. 3) is initiated and the processor 102 initiates execution of the initial segment of the software program (e.g., an initial portion of a boot-up segment stored in the basic input-output (BIOS) memory of the processor 102). In the meantime, the processor 102 encounters a waitpoint at the end of the initial segment (or at the start of the next segment) of the software program and therefore suspends execution of the software program until the waitpoint condition is satisfied.

At block 604, the method 600 includes determining whether the waitpoint condition for the associated segment is satisfied based on the current counter value 168 of the hardware counter 150. In one embodiment, the hardware counter 150 is polled by the processor 102 (using, e.g., a load instruction to access the hardware counter 150) and the current counter value 168 is associated with the corresponding waitpoint value. In this implementation, the waitpoint value represents sufficient memory initiation to facilitate execution of the next segment. Accordingly, the waitpoint condition can be determined to be satisfied if the current counter value 168 matches the waitpoint value or has proceeded beyond the waitpoint value. Alternately, the waitpoint condition can be determined to be satisfied if the current counter value 168 is within a predetermined threshold of the waitpoint value. In the event that the waitpoint condition is not met based on the current counter value 168, the process of blocks 602 and 604 are repeated until the waitpoint condition is determine to be met.

When the waitpoint condition is determined to be met, in one embodiment the next waitpoint condition is configured for the software program at block 606. To illustrate, the software program can include instructions that are used to dynamically calculate the next waitpoint based on any of a variety of factors, such as the storage capacity expected to be required for the next segment, and the like. Accordingly, the configuration of the next waitpoint can include the processor 102 executing an instruction to load the next waitpoint value to one of the waitpoint registers 162 or 164. In another embodiment, the waitpoint values are static and therefore can be initially configured together at block 602.

At block 608, the next segment of the software program is executed until either a waitpoint condition for the following segment is encountered or the software program terminates. If a following segment of the software program is identified at block 610, flow returns to block 604 and the process of blocks 604-610 is repeated for the following segments of the software program. The method 600 terminates at block 612 after the last segment of the software program has been executed.

Figure 7:
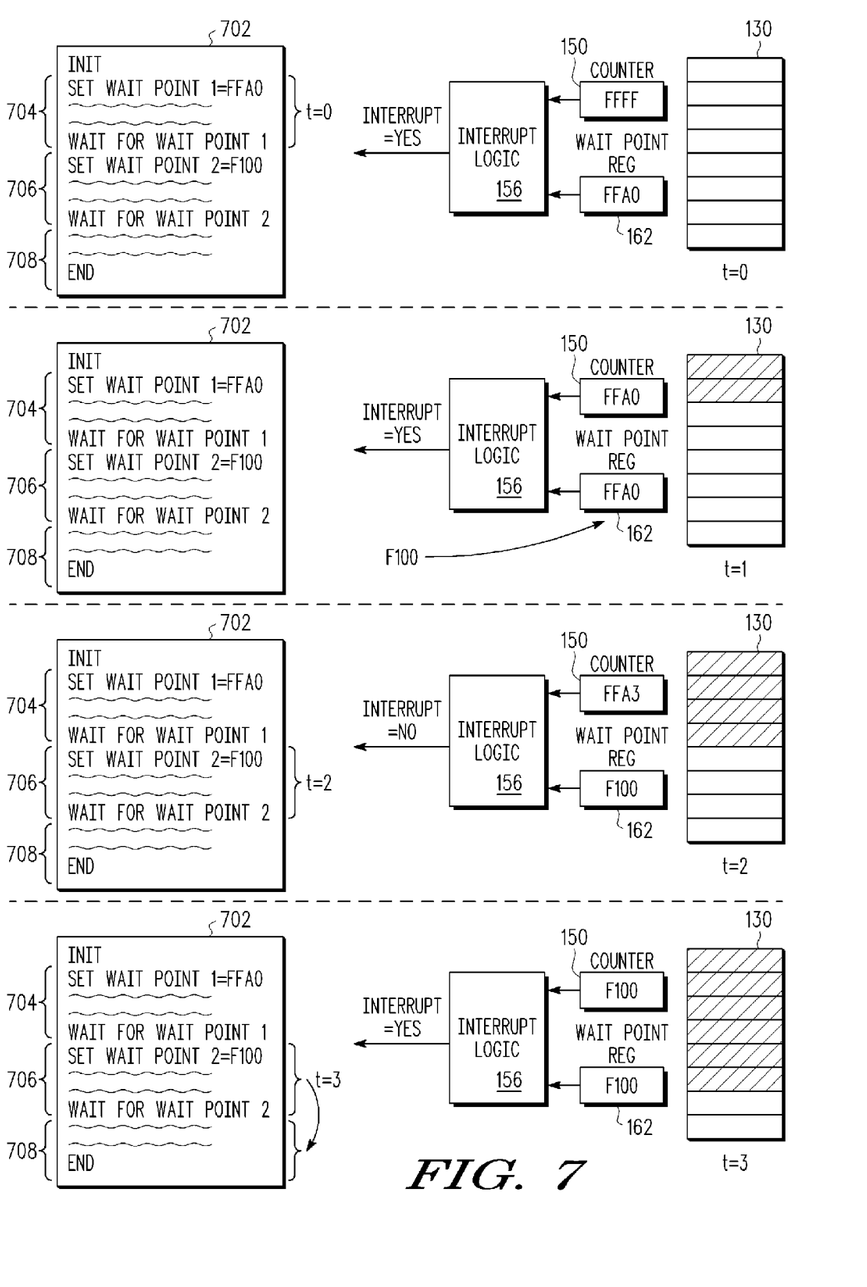
FIG. 7 is a diagram illustrating an example progressive initialization of a memory device in accordance with at least one embodiment of the present disclosure.

FIG. 7 illustrates an example software program execution utilizing memory initialization waitpoints in accordance with at least one embodiment of the present disclosure. For ease of illustration, the method 600 is described herein in the context of the data processing system 100 of FIG. 1. In at least one embodiment, the process represented by method 600 is performed concurrently with the memory initialization process represented by method 300 of FIG. 3.

In one embodiment, waitpoint conditions are determined based on the amount of initialized ECC memory required by the individual segments of a software program 702. In one embodiment, the segments (e.g., segments 704, 706, and 708) are determined by beginning with a small amount of initialized memory, and continuing with successive segments that require additional capacity of initialized memory. A subsequent segment may utilize previously initialized memory utilized by a prior segment in accordance with the needs and constraints of the overall program algorithm. Reinitialization is not required once the ECC syndrome values have been initialized one time, since subsequent writes to the ECC protected memory will result in an updated ECC syndrome being stored. By partitioning the program into segments with increasing memory capacity needs in later segments, initial segments may begin execution more quickly and can overlap the operation of the initialization process conducted by initialization module 134, thus reducing the overhead for performing initialization both in performance and in response time.

Accordingly, in the depicted example, the software program 702 is processed for execution at the processor 102 at time t=0. The software program 702 includes three segments, segments 704, 706, and 708, whereby the executions of segments 706 and 708 are predicated on waitpoint conditions "waitpoint1" and "waitpoint2", respectively, being met. At time t=0, the hardware counter 150 is initialized to a value xFFFF and the processor 102 executes an instruction of segment 704 that results in the loading of the waitpoint value xFFA0 into the waitpoint register 162. The initialization module 134 begins the memory initiation process of the memory array 130 as described with respect to FIG. 3. Accordingly, as the counter value of the hardware counter 150 does not match the waitpoint value xFFA0 at time t=0, no interrupt request is generated by the interrupt logic 156. The execution of the segment 704 continues until the processor 102 encounters an execution suspend instruction that directs the processor 102 to wait for an interrupt request based on the waitpoint1 condition.

At time t=1, a portion of the memory array 130 has been initialized (as represented by the shaded portion) and the hardware counter 150 has decremented to a counter value of xFFA0, which matches the waitpoint value xFFA0 stored in the waitpoint register 162. Accordingly, the interrupt logic 156 generates an interrupt request, which is processed by the processor 102 and thus permits the next section (segment 706) to be executed. In the illustrated example, the segment 706 includes an instruction to load the next waitpoint value (xF100) into the waitpoint register 162. The execution of the segment 704 continues until the processor 102 encounters an execution suspend instruction that directs the processor 102 to wait for an interrupt request based on the waitpoint2 condition.

At time t=2, additional memory locations of the memory array 130 have been initialized and the hardware counter 150 has decremented to a counter value of xFAA3. However, because the counter value does not match the waitpoint value xF100 in the waitpoint register 162, no interrupt request is generated by the interrupt logic 156.

At time t=3, additional memory locations of the memory array 130 have been initialized and the hardware counter 150 has decremented to a counter value of xF100. Because the counter value at this point matches the waitpoint value xF100 in the waitpoint register 162, the interrupt logic 156 generates an interrupt request which is processed by the processor 102 and thus permits the next section (segment 708) to be executed.

As the example software execution of FIG. 7 illustrates, a software program 702 (which can represent, for example, an interrupt handling routine, a boot-up routine, and the like) can be progressively executed in segments concurrent with the initialization of the memory device 104, whereby the execution of each successive segment can be dependent on the progress of the memory initialization process. Thus, the software program 702 can be permitted to begin execution before the entire memory array 130 has been initialized, while the segmentation helps to ensure that sufficient storage capacity is initialized and available from the memory array 130. In one embodiment, since the initialization may have been triggered by for example, an interrupt request that causes the system to exit from a low power state, responding to the interrupt with low latency is a considerable aspect of the operation of the system. The techniques described herein can provide an improved capability for lowering the initial latency following a wakeup event, thus allowing for improved response of the system.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

As used herein, the term "bus" is used to refer to a plurality of signals or conductors that may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
  initializing a counter value of a hardware counter in response to an initialization stimulus;
  iteratively adjusting the counter value and storing an initialization value to a memory location of a memory array using a memory address that is based on the counter value;
  generating an interrupt request based on a comparison of the counter value to a waitpoint value concurrent with iteratively adjusting the counter value and storing the initialization value;
  suspending an execution of a software program by a data processor prior to the generation of the interrupt request; and resuming the execution of the software program in response to the generation of the interrupt request.

2. The method of claim 1, further comprising:
replacing the waitpoint value with another waitpoint value in response to resuming the execution of the software program.

3. The method of claim 1, wherein the initialization stimulus is selected from a group consisting of: a reset stimulus; and a power-on stimulus.

4. The method of claim 1, wherein:
initializing the counter value of the hardware counter comprises setting the counter value to a non-zero number; and
adjusting the counter value comprises decrementing the counter value.

5. The method of claim 1, further comprising:
executing, with a data processor, a store instruction so as to configure the waitpoint value.

6. The method of claim 1, further comprising:
determining, with a data processor, a progress of an initialization of the memory array based on the counter value.

7. The method of claim 1, wherein generating the interrupt request comprises:
generating the interrupt request in response to determining that the counter value is equal to the waitpoint value.

8. The method of claim 7, further comprising:
accessing the counter value from the hardware counter;
accessing the waitpoint value from a register; and
comparing the counter value to the waitpoint value to determine whether the counter value has become equal to the waitpoint value.

9. The method of claim 1, wherein storing an initialization value to a memory location comprises storing the initialization value to a data location and an error correcting code location of the memory location.

10. A system comprising:
a memory device comprising:
a memory array comprising a plurality of memory locations; and
an initialization module comprising:
a counter;
a first register configured to store a first waitpoint value;
write logic configured to write an initialization value to a memory location of the memory array associated with a memory address that is based on a counter value of the counter; and
interrupt logic configured to generate a first interrupt request based on a comparison of the counter value of the counter to the first waitpoint value concurrent with iteratively adjusting the counter value and writing the initialization value; and
a processor coupled to the memory device and configured to receive the first interrupt request and to resume a suspended execution of a software program in response to receiving the first interrupt request.

11. The system of claim 10, wherein the memory device further comprises:
address generation logic configured to generate the memory address based on the counter value of the counter.

12. The system of claim 10, wherein the memory device further comprises:
a register configured to store the initialization value.

13. The system of claim 10, further comprising:
an error detect/correct module configured to perform an error correction process using data and error correcting code information from an accessed memory location of the memory array.

14. The system of claim 10, wherein the processor is configured to determine a progress of an initialization of the memory device based on the counter value.

15. The system of claim 10, further comprising:
a second register configured to store a second waitpoint value; and
wherein the interrupt logic is configured to generate a second interrupt request based on a comparison of the counter value to the second waitpoint value.

16. The system of claim 10, wherein the interrupt logic is configured to generate the first interrupt request in response to determining that the counter value is equal to the first waitpoint value.

17. A system comprising:
a processor;
interrupt logic configured to generate an interrupt request based on a comparison of a counter value of a hardware counter to a waitpoint value stored in a register concurrent with iteratively adjusting the counter value and writing an initialization value to a memory of a memory array; and
a computer-readable medium embodying a set of executable instructions, the set of executable instructions including at least one executable instruction configured to manipulate the processor to:
store a waitpoint value at the register;
suspend an execution of the set of executable instructions to wait for an interrupt request from the interrupt logic based on the waitpoint value; and
resume the execution of the set of executable instructions in response to the interrupt request from the interrupt logic.

18. The system of claim 17, further comprising:
an error detect/correct module configured to perform an error correction process using data and error correcting code information from an accessed memory location of the memory array.

19. The system of claim 17, further comprising:
a second register configured to store a second waitpoint value; and
wherein the interrupt logic is configured to generate a second interrupt request based on a comparison of the counter value to the second waitpoint value.

20. The system of claim 17, wherein the interrupt logic is configured to generate the first interrupt request in response to determining that the counter value is equal to the first waitpoint value.

* * * * *